United States Patent
Duchesne et al.

(10) Patent No.: US 6,820,212 B2
(45) Date of Patent: Nov. 16, 2004

(54) RAID SYSTEM HAVING CHANNEL CAPACITY UNAFFECTED BY ANY SINGLE COMPONENT FAILURE

(75) Inventors: Raymond Duchesne, Round Hill, VA (US); Tomlinson Rauscher, Ellicott City, MD (US)

(73) Assignee: Digi-Data Corporation, Columbia, MD (US)

(*) Notice: Subject to any disclaimer, the term of this patent is extended or adjusted under 35 U.S.C. 154(b) by 504 days.

(21) Appl. No.: 09/785,282

(22) Filed: Feb. 20, 2001

(65) Prior Publication Data

US 2002/0116660 A1 Aug. 22, 2002

(51) Int. Cl.[7] .............................................. G06F 11/00
(52) U.S. Cl. .................. 714/7; 714/5; 714/6; 714/8; 714/9; 714/42
(58) Field of Search .................. 714/5–9, 42

(56) References Cited

U.S. PATENT DOCUMENTS

| | | | | |
|---|---|---|---|---|
| 4,141,066 A | * | 2/1979 | Keiles | 700/81 |
| 5,651,110 A | | 7/1997 | Powers et al. | |
| 5,787,070 A | | 7/1998 | Gupta et al. | |
| 5,790,775 A | | 8/1998 | Marks et al. | |
| 5,848,230 A | | 12/1998 | Walker | |
| 5,872,906 A | | 2/1999 | Morita et al. | |
| 5,922,077 A | | 7/1999 | Espy et al. | |
| 5,928,367 A | * | 7/1999 | Nelson et al. | 714/6 |
| 5,933,824 A | * | 8/1999 | DeKoning et al. | 707/8 |
| 5,944,838 A | | 8/1999 | Jantz | |
| 5,975,738 A | * | 11/1999 | DeKoning et al. | 700/79 |
| 6,073,218 A | * | 6/2000 | DeKoning et al. | 711/150 |
| 6,192,484 B1 | * | 2/2001 | Asano | 714/6 |
| 6,338,110 B1 | * | 1/2002 | van Cruyningen | 710/317 |
| 6,343,324 B1 | * | 1/2002 | Hubis et al. | 709/229 |
| 6,418,539 B1 | * | 7/2002 | Walker | 714/5 |
| 6,449,289 B1 | * | 9/2002 | Quicksall | 370/475 |
| 6,460,149 B1 | * | 10/2002 | Rowlands et al. | 714/43 |
| 6,601,128 B1 | * | 7/2003 | Burton et al. | 710/316 |
| 6,618,821 B1 | * | 9/2003 | Duncan et al. | 714/14 |

* cited by examiner

*Primary Examiner*—Robert Beausoliel
*Assistant Examiner*—Emerson Puente
(74) *Attorney, Agent, or Firm*—William S. Ramsey

(57) ABSTRACT

The RAID system of this invention is able to function with undiminished capacity despite the failure of any one DASD, connector, or storage array controller. A signal is produced when any component fails, thereby alerting the operator of the need to replace the failed component. The reliability of this RAID system is achieved by using two connectors for each connection, by using a spare DASD for each channel of DASD, and by providing a passive storage array controller able to assume the identify of and take over the control of the DASD controlled by a failed storage array controller. This is a reliable, inexpensive system for achieving unprecedented reliability in the storage and delivery of data.

2 Claims, 9 Drawing Sheets

RAID SYSTEM HAVING CHANNEL CAPACITY UNAFFECTED BY ANY SINGLE COMPONENT FAILURE

CROSS-REFERENCE TO RELATED APPLICATIONS.

Not Applicable

STATEMENT REGARDING FEDERALLY SPONSORED RESEARCH OR DEVELOPMENT.

Not Applicable

Reference to a "Microfiche appendix."

Not Applicable

BACKGROUND OF THE INVENTION.

1. Field of the Invention

This invention relates to RAID systems with provisions for maintaining the speed or channel capacity of the system under conditions of single component failure.

2. Description of Related Art Including Information Disclosed Under 37 CFR 1.97 AND 37 CFR 1.98.

The present invention is a RAID system which has redundant connections between active storage array controllers and the arrays of storage units they control, spare storage units in each array, and a passive storage array controller which assumes the control of the array of storage units of any failed storage array controller. Thus the failure of any one connector, storage unit, or storage array controller does not affect the channel capacity or speed of the RAID system of this invention.

U.S. Pat. No. 5,651,110 discloses a RAID system with two second level storage array controllers each of which control an array of disk drives. Each second level storage array controller is controlled by a separate first level storage array controller, which, in turn, communicates with the computer. In the event of a failure of a second level storage array controller, control of the array of disks assigned to the failed storage array controller is assumed by the intact second level storage array controller, which now controls both its original disks and the disks of the failed second level storage array controller. The channel capacity of the RAID system is thereby reduced by half under conditions of a failed second level storage array controller.

U.S. Pat. No. 5,787,070 discloses a global computer network packet switching system in which a number of active service modules are backed up by a normally passive redundancy module which takes the load when one of the active service modules fails. The communication system has no provisions for data storage.

U.S. Pat. No. 5,790,775 discloses a data storage system with a SCSI environment. The system involves two storage array controllers in dual-active, redundant configuration, and associated physical storage media. Failure of one storage array controller results in the other storage array controller assuming the control of all of the SCSI units (failover). The reverse operation, wherein the defective storage array controller is repaired or replaced and assumes control of its portion of the storage media, is termed "failback". The channel capacity of the data storage system is reduced by half under conditions of a failed storage array controller.

U.S. Pat. No. 5,848,230 discloses a RAID system in which there is triple replication of all subsystems. It has three storage array controllers, one active and two which are normally passive and are used only in case of the failure of the active storage array controller and (subsequently) the secondary storage array controller. In addition, triplicate subsystems such as cooling and power subsystems are included. This system provides highly reliable and continuous availability of storage service and an undiminished channel capacity. The provision of two normally passive storage array controllers for each active storage array controller is a major contributor to the cost of this system.

U.S. Pat. No. 5,872,906 discloses a RAID system with provisions for allocating a spare disk unit in case of a disk failure. It includes two substorage array controllers which are provided for the common buses thereby distributing the processing functions of the storage array controllers and reducing a load. No provisions for failure of a storage array controller are disclosed.

U.S. Pat. No. 5,922,077 discloses a RAID system with two storage array controllers and a fail-over switch which routes the data from the storage array controller of a failed communication path to the operating storage array controller, which then handles the load of both storage array controllers. The channel capacity is reduced when one storage array controller is handling both loads.

U.S. Pat. No. 5,944,838 discloses a RAID system with a redundant storage control module (RDAC) in which two queues of pending I/O requests are maintained for a single array of storage devices. The redundant queue takes over on the failure of the active queue. The redundant queue copies each I/O request sent to the active path which minimizes the time required for the redundant queue to take over the functions of the active queue.

U.S. Pat. No. 6,073,218 discloses an apparatus for coordinating multiple RAID storage array controllers' access to a single array of storage devices. Each of a number of storage array controllers process different I/O requests on an array of common shared storage devices. One storage array controller is designated primary with respect to the storage devices. Concurrent access to the storage devices is coordinated by the storage array controllers.

None of the prior art RAID systems achieves the advantages of the present invention, that of preserving the channel capacity or speed of the system in the face of failure of a connector, storage unit, or storage array storage array controller, all with minimal redundancy of components and minimal cost. In particular, in this invention a single passive storage array controller is available to replace any one of two or more active storage array controllers when an active storage array controller becomes defective.

BRIEF SUMMARY OF THE INVENTION

This invention is RAID system which is able to function with undiminished channel capacity or speed despite the failure of any one component, with minimal redundancy of components. The system comprises n active storage array controllers, n arrays of storage units, each active storage array controller controlling one or more arrays of storage units, and one only passive storage array controller. The passive storage array controller is connected by two connectors to each active storage array controller, and is able to control any one of the arrays of storage devices. In the event of failure of any of the active storage array controllers, the passive storage array controller assumes the identity of the failed storage array controller and assumes control of the array of storage devices of the failed storage array controller. Since each array of storage units contains a spare unit which becomes active when one storage unit in the array fails, the RAID system of this invention is able to function with undiminished capacity in the event of failure of any one storage unit or any one storage array controller. In another embodiment, each storage unit is connected to controllers by two connectors, and this embodiment is, in addition, able to function in the event of failure of any one connector.

The objective of this invention is to provide a RAID system with undiminished capacity despite the failure of any one storage unit, any one connector, or any one storage array controller.

Another objective is to provide a RAID system which produces a signal for the operator in the event of failure of any component.

Another objective is to provide a RAID system which automatically substitutes a replacement for a failed storage unit or storage array controller.

Another objective is to provide a RAID system with redundant connectors connecting the storage units and the storage array controllers.

Another objective is to provide a RAID system with several active storage array controllers which normally control the arrays of storage units and with one passive storage array controller which assumes control the storage units of any active storage array controller which fails.

Another objective is to provide a RAID system capable of functioning with undiminished channel capacity in the event of failure of a connector, storage unit, or storage array controller with minimal redundancy of components.

Another objective is to provide a RAID system capable of functioning with undiminished channel capacity in the event of failure of a connector, storage unit, or storage array controller without incurring the expense of a back-up storage array controller for each active storage array controller.

Another objective is to provide a RAID system capable of functioning with undiminished channel capacity in the event of failure of a connector, storage unit, or storage array controller at minimal expense.

A final objective is to produce a RAID system simply constructed of inexpensive, readily obtainable components without adverse effects on the environment.

DETAILED DESCRIPTION OF THE INVENTION.

In this patent application the term "channel capacity" means the ability of a given channel subject to specific constraints to transmit messages from a specified message source expressed as the maximum possible average transinformation rate, which can be achieved with an arbitrary small probability of errors by use of an appropriate code. The channel capacity of a RAID system is commonly referred to as the "speed" of the system.

Figure 1:
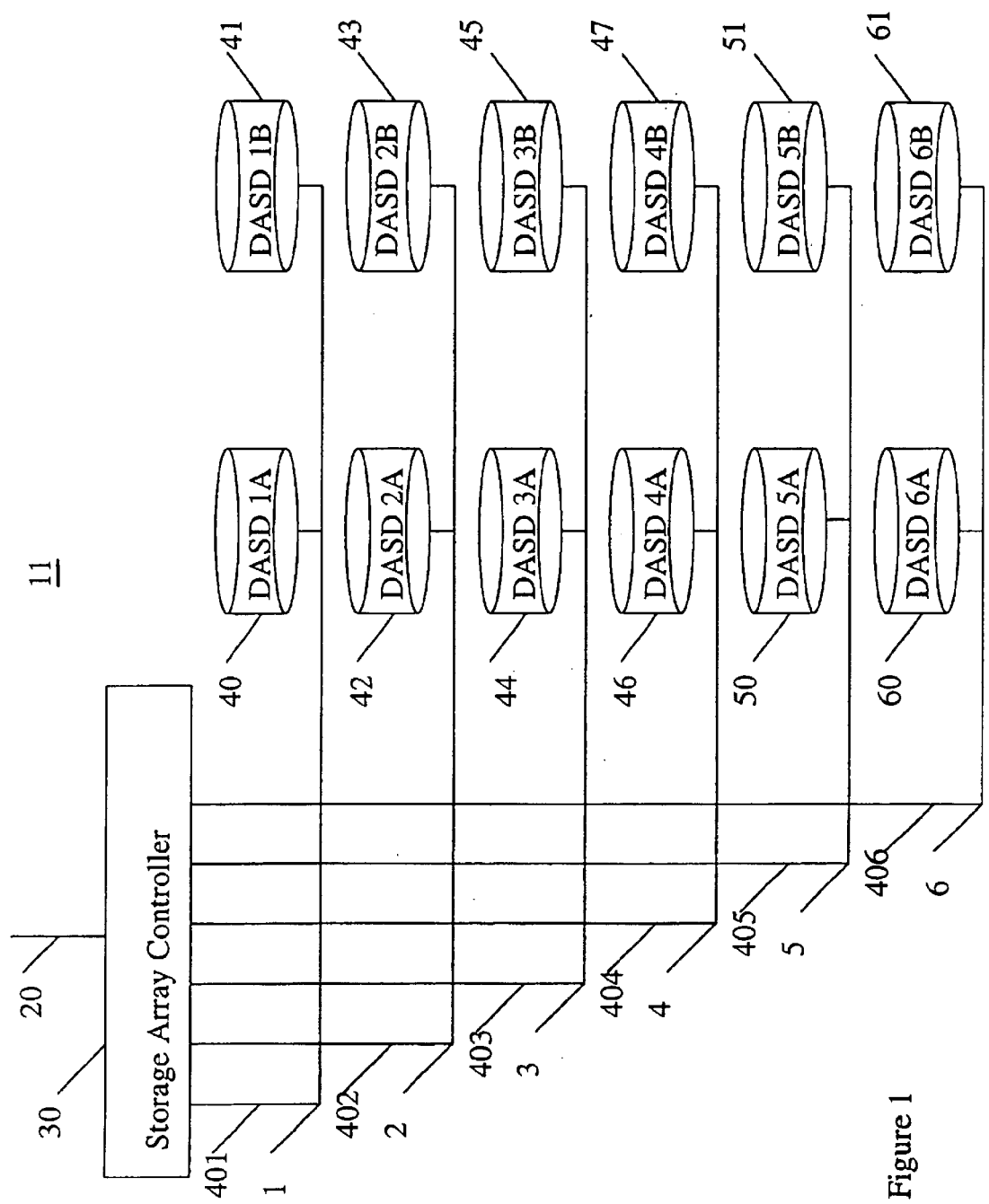
FIG. 1 is a diagrammatic depiction of a single RAID subsystem.

FIG. 1 is a schematic of the external view of a RAID system referred to in this application as a "single RAID subsystem" 11. The single RAID subsystem comprises a storage array controller 30, and an array of direct access storage devices (DASD) or storage units 40–61. A host computer is electrically connected to the storage array controller 30 by connector 20.

Any suitable connector may be used, such as a wire, copper wire, cable, optical fiber, or a SCSI bus.

In all of the Figs. the convention is followed of depicting connectors which are not electrically connected as lines which cross perpendicularly. An electrical connection is indicated by a line which terminates perpendicularly at another line or at a symbol for a component. Thus in FIG. 1 a host computer (not shown in FIG. 1) is electrically connected to storage array controller 30 by connector 20. The host computer is not considered part of the single RAID subsystem and is not shown in FIG. 1. Connector 401 is electrically connected to storage array controller 30 and to DASD 1A 40 and to DASD 1B 41, but is not electrically connected to connectors 402 to 406. Connector 402 connects storage array controller 30 with DASD 2A 42 and DASD 2B 43. Connector 403 connects storage array controller 30 with DASD 3A 44 and DASD 3B 45. Connector 404 connects storage array controller 30 with DASD 4A 46 and DASD 4B 47. Connector 405 connects storage array controller 30 with DASD 5A 50 and DASD 5B 51. Connector 406 connects storage array controller 30 with DASD 6A 60 and DASD 6B 61.

In the configuration in FIG. 1, for example, data are striped over DASD 1A 40, DASD 2A 42, DASD 3A 44, and DASD 4A 46. DASD 5A 50 is a parity disk which is used to check the accuracy of data striped on the disks DASD 1A–4A and to substitute for a failed DASD. DASD 6A is a spare disk which is used to substitute for any one of disks DASD 1A–5A which have failed.

DASD may be disks, tapes, CDS, or other suitable storage device. A preferred DASD is a disk.

All the storage units or DASD and connectors in a system taken as a whole is referred to as an "array" of storage units or DASD, respectively. In the examples here the DASD are arranged in channels which consist of a number of DASD which are electrically connected to each other and to the storage array controller by connectors. The channels are designated in FIG. 1 as 1–6. The number of channels may vary. A preferred number of channels is 6.

A channel, for example channel 1, consists of connector 401, DASD 1A 40, and DASD 1B 41. Although only two DASD are depicted in channel 1 of FIG. 1, there may be as many as 126 DASD in a channel. A preferred number of DASD in a channel is five.

A group of DASDs served by separate channels across which data is striped is referred to as a "tier" of DASDs. A DASD may be uniquely identified by a channel number and a tier letter, for example DASD 1A is the first disk connected to channel 1 and tier A of the storage array controller.

A preferred storage array controller is the Fibre Sabre 2100 Fibre Channel RAID storage array controller manufactured by Digi-Data Corporation, Jessup, Md.

Additional tiers of DASDs may be used.

Any suitable host computer may be used. A preferred host computer is a PENTIUM microchip-based personal computer available from multiple vendors such as IBM, Research Triangle park, North Carolina; Compaq Computer Corp., Houston Tex.; or Dell Computer, Austin, Tex. PENTIUM is a trademark for microchips manufactured by Intel Corporation, Austin, Tex.

Figure 2:
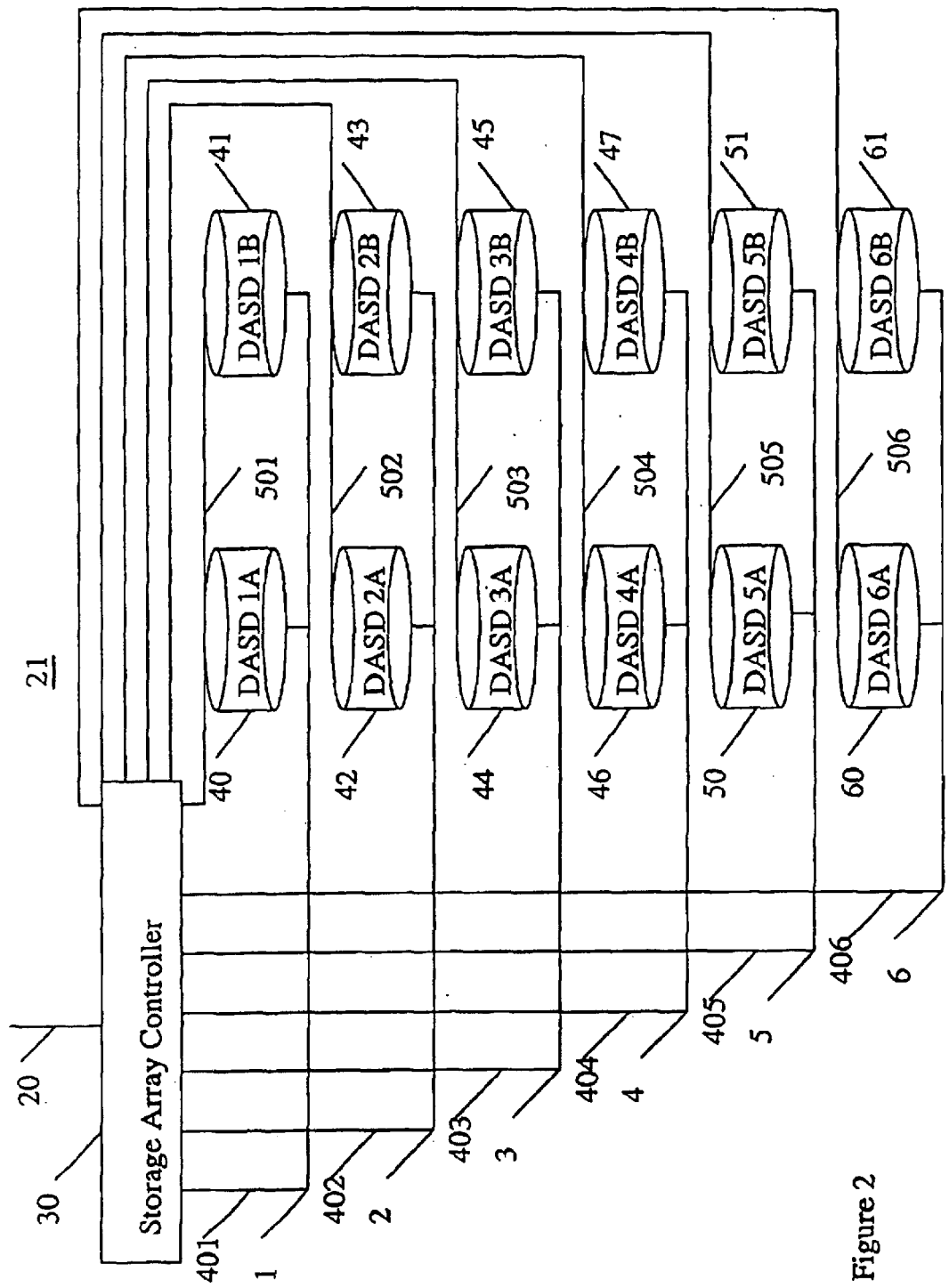
FIG. 2 is a diagrammatic depiction of a redundant single RAID subsystem.

FIG. 2 is a schematic of a RAID system referred to in this application as a "redundant single RAID subsystem" 21. The redundant single RAID subsystem 21 is identical to the single RAID subsystem 11 of FIG. 1 except that each DASD in the redundant single RAID subsystem is connected to the storage array controller 30 by two connectors. Connector 501 is connected to disk array storage array controller 30 and to DASD 1A 40 and DASD 1B 41. Connector 502 connects storage array controller 30 with DASD 2A 42 and DASD 2B 43. Connector 503 connects storage array controller 30 with DASD 3A 44 and DASD 3B 45. Connector 504 connects storage array controller 30 with DASD 4A 46 and DASD 4B 47. Connector 505 connects storage array controller 30 with DASD 5A 50 and DASD 5B 51. Connector 506 connects storage array controller 30 with DASD 6A 60 and DASD 6B 61.

The single RAID subsystem 11 in FIG. 1, and redundant single RAID subsystem 21 in FIG. 2 therefore are protected against failure of any two disks, by the inclusion of a parity disk DASD 5A 50 and DASD 5B 51 and by the inclusion of a spare disk DASD 6A 60 and DASD 6B 61 in each channel. The redundant single RAID subsystem 21 in FIG. 2 is protected against failure of any single connector which connects a DASD to the storage array controller 30 by the inclusion of two connectors, for example 401 and 501, which connect each DASD, for example DASD 1A 40, to the storage array controller 30.

Figure 3:
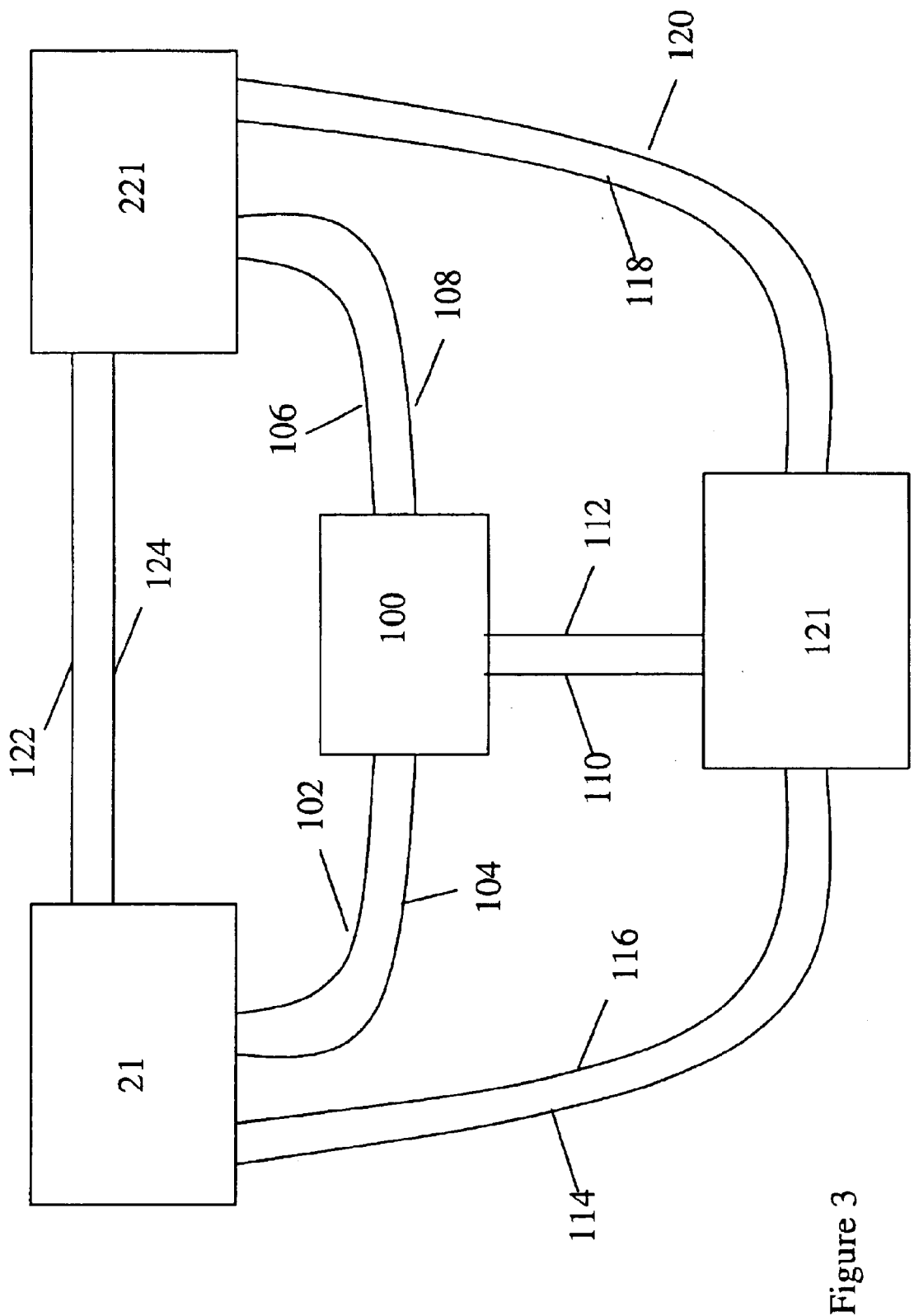
FIG. 3 is a diagrammatic depiction of the first embodiment RAID system of this invention having three active storage array controllers and one passive storage array controller.

FIG. 3 shows the first embodiment RAID system of the present invention. In this system, the storage array controller of redundant RAID subsystem 21 is connected to the storage array controller of redundant RAID subsystem 121 by two connectors, depicted in FIG. 3 as connectors 114 and 116. All connectors in FIG. 3 are bidirectional connectors. Subsystem 121 is connected to subsystem 221 by connectors 118 and 120. Subsystem 221 is connected to subsystem 21 by connectors 122 and 124. Subsystems 21, 121, and 221 each has an array of DASD and are used for normal RAID functions. Each storage array controller of subsystems 21, 121, and 221 therefore is attached to two adjacent storage array controllers, forming a ring of storage array controllers. The storage array controllers for subsystems 21, 121, and 221 are referred to as "active" storage array controllers because in the normal function of the RAID system these storage array controllers are actively involved in controlling the arrays of DASD in reading and writing data.

Storage array controller 100 is similar to the storage array controllers of subsystems 21, 121, and 221 except that it is not normally associated with an array of DASD. Storage array controller 100 is a "passive" storage array controller and serves as a back-up for the storage array controllers associated with subsystems 21, 121, and 221. Storage array controller 100 is connected to the storage array controller of subsystem 21 by connectors 102 and 104; to the storage array controller of subsystem 121 by connectors 110 and 112; and to the storage array controller of subsystem 221 by connectors 106 and 108.

The storage array controller of subsystems 21, 121, and 221 contain internal software which generates a binary signal termed a "normal operating signal" or a "heartbeat" at an interval of a few milliseconds when the storage array controllers of the respective subsystems are operational. When the storage array controller is in a defective condition, the emission of the normal operating signal ceases.

The normal operating signal is emitted from the storage array controller of subsystem 21 over connector 114 to the disk array storage array controller of subsystem 121. In similar fashion, the normal operating signal is emitted from the storage array controller of subsystem 121 over connector 118 to the storage array controller of subsystem 221. Finally, the normal operating signal is emitted from the storage array controller of subsystem 221 over connector 122 to the storage array controller of subsystem 21.

When one storage array controller, for example 121, no longer receives the normal operating signal because the storage array controller of the adjacent subsystem, 21 in this example, is defective, the receiving storage array controller 121, referred to as the "reporter" storage array controller, emits an activation signal to the passive storage array controller 100. On receipt of this activation signal, the passive storage array controller 100 assumes the identify of the failed storage array controller of subsystem 21. The passive storage array controller consults a table stored on each DASD and identifies the DASD of the defective storage array controller 21. The passive storage array controller 100 then assumes control of the DASD array of subsystem 21.

In the first embodiment depicted in FIG. 3 each active controller 21, 121, and 221 also emits a heartbeat to the passive controller 100 over connectors 102, 110, and 106, respectively. Failure of the heartbeat from any one active controller also activates the passive controller to assume identify of the failed controller, as described above. This system provides redundancy in that the passive controller is signaled concerning the failure of an active controller by both indirectly by the reporter storage array controller and directly by the failure of the heartbeat from the defective active storage controller.

Finally, failure of an active storage array controller 21 causes the reporting storage array controller 121 or the passive storage array controller 100 to emit a warning signal which indicates to the operator of the RAID system that a storage array controller has failed and requires repair or replacement.

Although a single connector is described in the above example, each disk array storage array controller may be connected to adjacent storage array controllers by two redundant connectors. This assures that the failure of one connector between storage array controllers will not result in the loss of communication between the storage array controllers, because the other connector will convey the signal. In a similar fashion, the passive storage array controller 100 may be connected to the storage array controllers of subsystems 21, 121, and 221 by two redundant connectors which assure communications in the event of failure of any one connector. Thus the passive storage array controller is able to assume the identity and function of any of the active storage array controllers even in the event of the failure of any one connector between the passive storage array controllers and the active storage array controllers.

Figure 4:
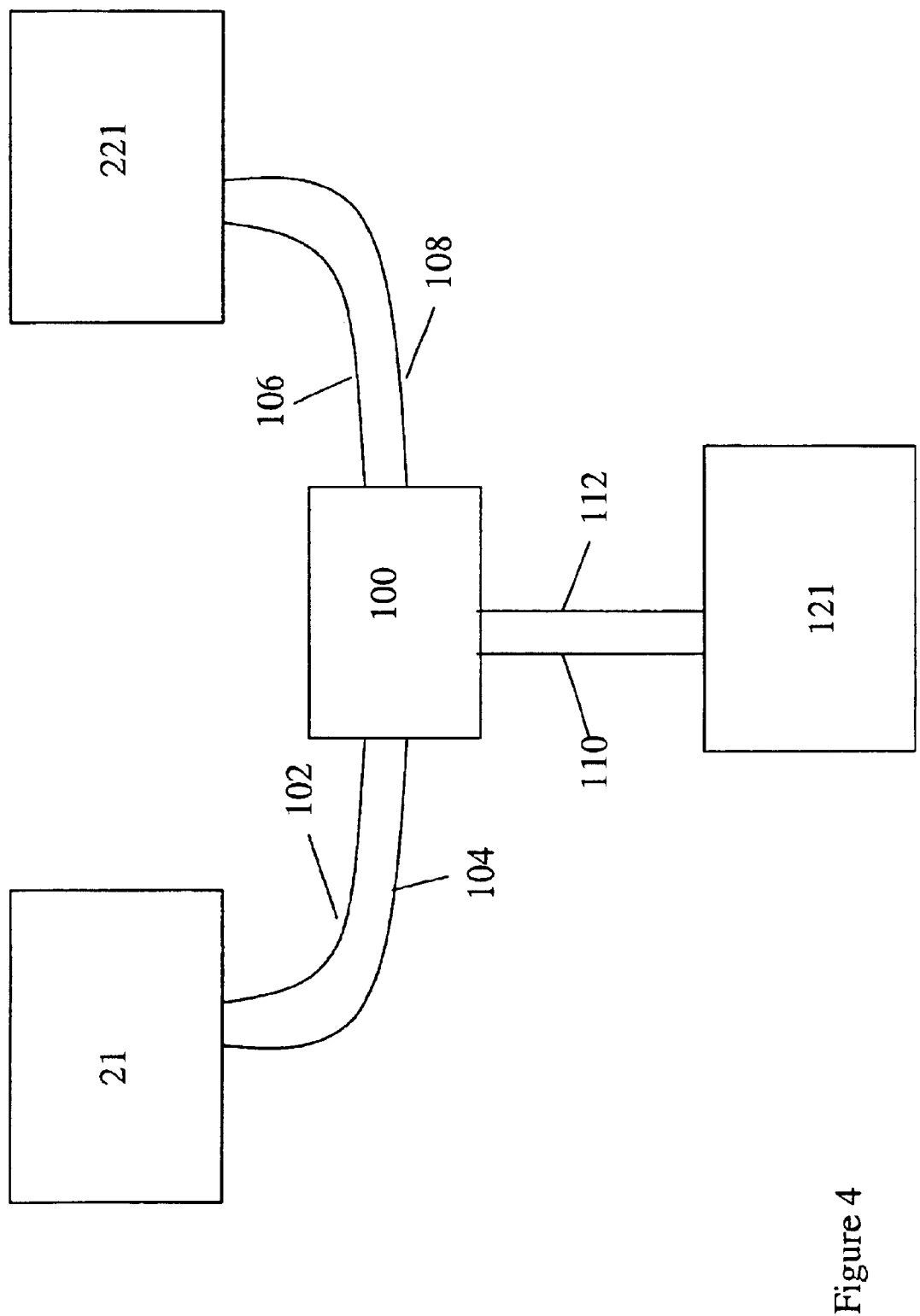
FIG. 4 is a diagrammatic depiction of the second embodiment RAID system of this invention having three active storage array controllers and one passive storage array controller.

FIG. 4 shows a second embodiment of the RAID system of the present invention. The second embodiment shown in FIG. 4 is the same as the first embodiment shown in FIG. 3 except that the connectors 114–124 are omitted. The second embodiment has the advantage of lesser costs, as compared to the first embodiment, but, on the other hand, the second embodiment lacks the redundance afforded by the first embodiment.

Figure 5:
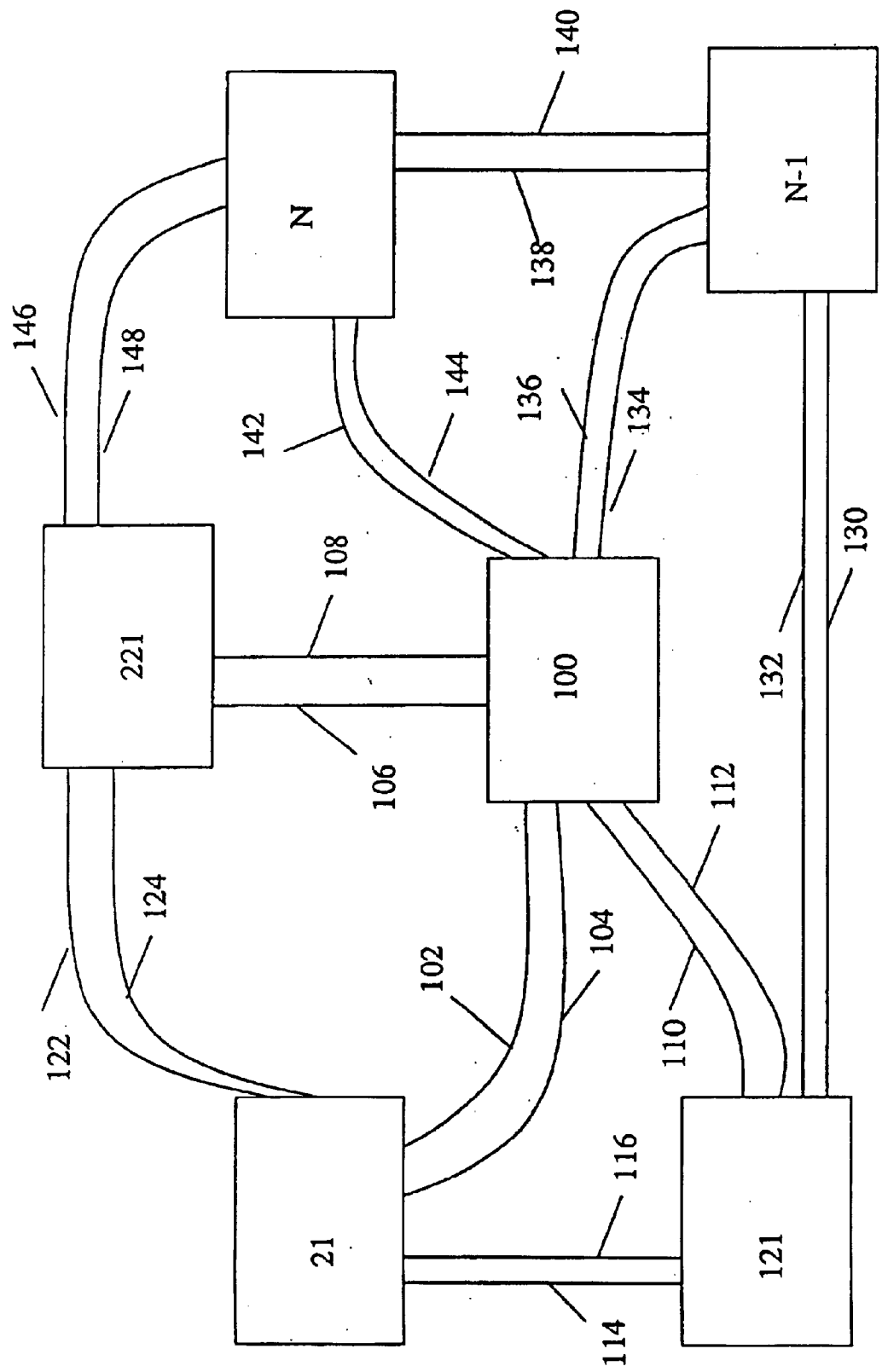
FIG. 5 is a diagrammatic depiction of the third embodiment RAID system of this invention having n active storage array controllers and one passive storage array controller.

FIG. 5 depicts a third embodiment RAID system with n redundant single RAID subsystems. The system of FIG. 5 is the same as that of FIG. 3 except for the inclusion of additional redundant single RAID subsystems represented by redundant single RAID subsystems n–1 and n. In the embodiment of FIG. 5, the connections between redundant single RAID subsystems 21, 121, and 221 with passive storage array controller 100 are as in FIG. 3 with the exceptions that subsystem 121 is connected to subsystem n–1 by connectors 130 and 132, and subsystem 221 is connected to subsystem n by connectors 146 and 148. Subsystem n–1 is connected to subsystem n by connectors 138 and 140. Passive storage array controller 100 is connected to subsystem n–1 by connectors 134 and 136. Passive storage array controller 100 is connected to subsystem n by connectors 142 and 144.

Figure 6:
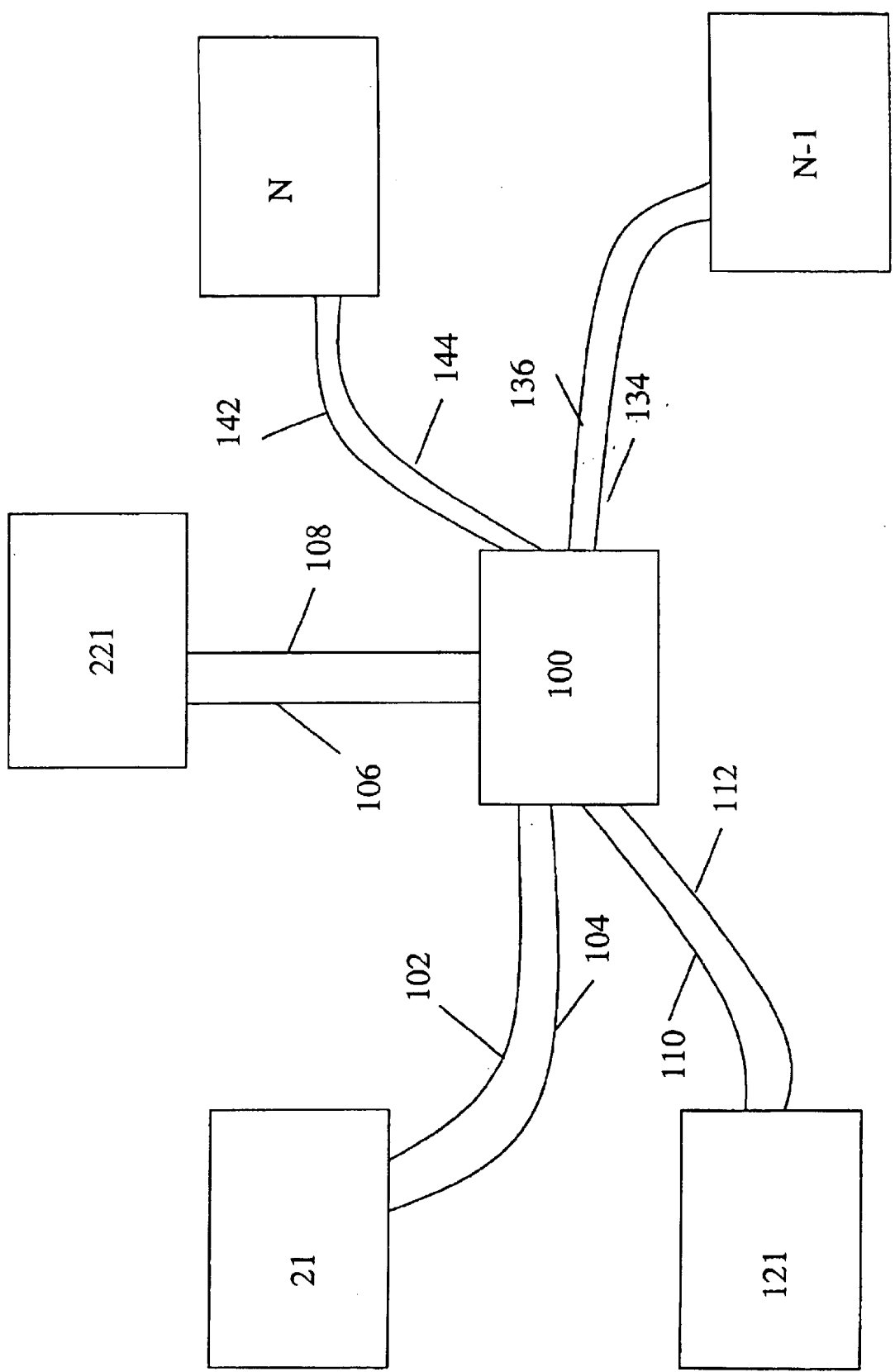
FIG. 6 is a diagrammatic depiction of the fourth embodiment RAID system of this invention having n active storage array controllers and one passive storage array controller.

FIG. 6 shows a fourth embodiment of the RAID system of the present invention. The fourth embodiment shown in FIG. 6 is the same as the third embodiment shown in FIG. 5 except that the connectors 114, 116, 122, 124, 130, 132, 138, 140, 146, 148, are omitted. The fourth embodiment has the advantage of lesser costs, as compared to the third embodiment, but, on the other hand, the fourth embodiment lacks the redundance afforded by the third embodiment.

In the first to fourth embodiments of the RAID system described above and shown in FIGS. 3–6, a component of each embodiment is the redundant single RAID subsystem, 21 in FIG. 2. The single RAID subsystem, 11 in FIG. 1, may be substituted for the redundant single RAID subsystem in the first to fourth embodiments. It should be noted that the failure of the single connector which connects the DASD of an array in a single RAID subsystem, 11 in FIG. 1, as incorporated in embodiments two to four of the RAID system, does not affect the channel capacity of the RAID systems of this invention. Failure of the single connector in a single RAID subsystem, 11 in FIG. 1, does affect the ability to access and store data in the DASD of the array. The loss of data access on the failure of a single connector is avoided in the redundant single RAID subsystem, 21 in FIG. 2, which has two connectors between each DASD and storage array controller.

Figure 7:
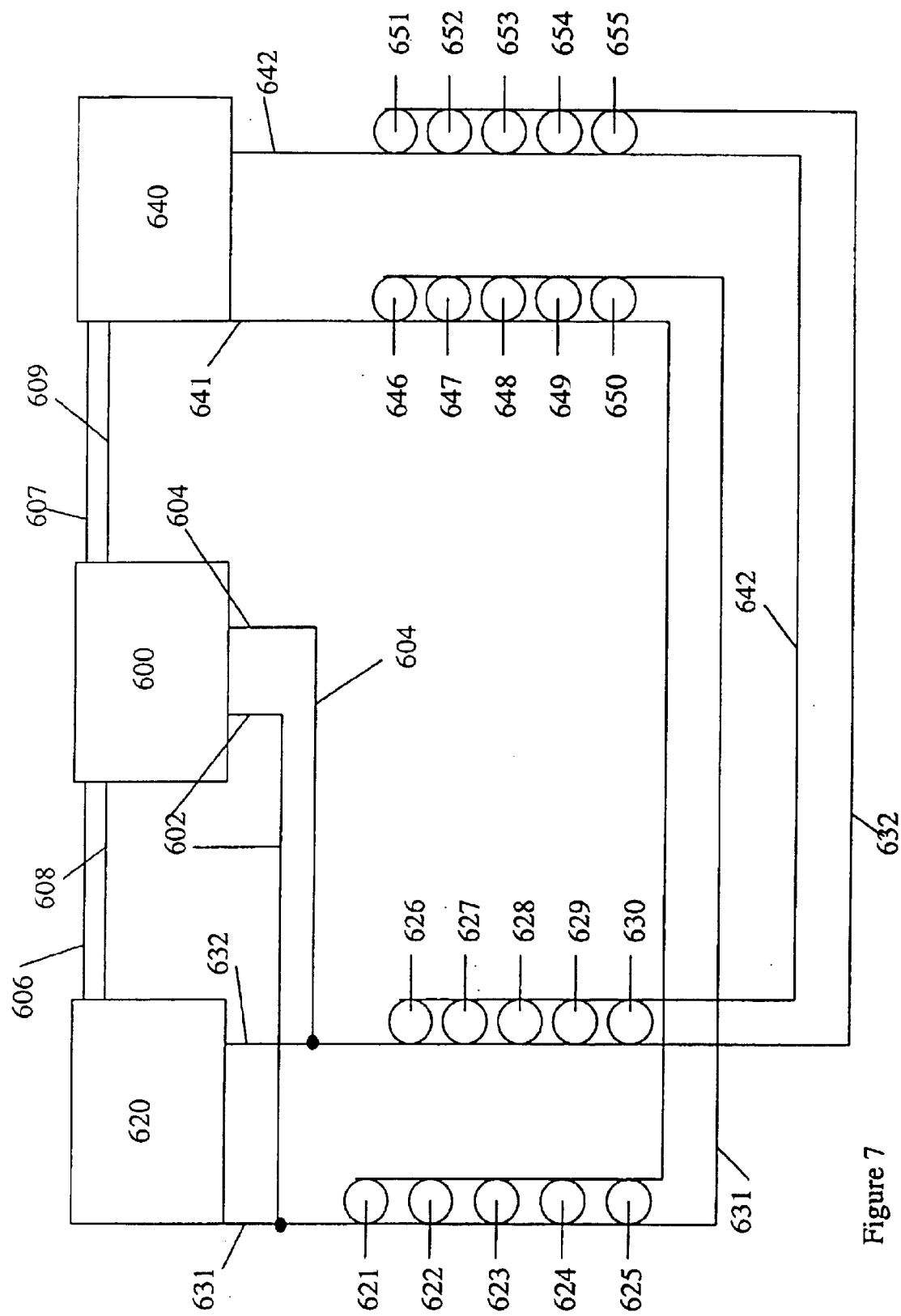
FIG. 7 is a diagrammatic depiction of the fifth embodiment RAID system of this invention having two active storage array controllers and one passive storage array controller.

FIG. 7 shows a fifth embodiment of the RAID system of the present invention. In FIG. 7, there are two active storage array controllers, 620 and 640, and one passive storage array controller 600. Active storage array controller 620 is connected to passive storage array controller 600 by connectors 606 and 608. Active storage array controller 640 is connected to passive storage array controller 600 by connectors 607 and 609.

Active storage array controller 620 has in its first channel dual-ported DASD 621–625 and is connected to these DASD by connector 631. Active storage array controller 620 has in its second channel dual-ported DASD 626–630 and is connected to these DASD by connector 632.

Active storage array controller 640 has in its first channel dual-ported DASD 646–650 and is connected to these DASD by connector 641. Active storage array controller 640 has in its second channel dual-ported DASD 651–655 and is connected to these DASD by connector 642.

Connector 631 is also connected to the dual-ported DASD 646–650. Connector 632 is also connected to the dual-ported DASD 651–655.

Connector 641 is also connected to the dual-ported DASD 621–625. Connector 642 is also connected to the dual-ported DASD 626–630.

Passive storage array controller 600 is connected by connector 602 to connector 631 and by connector 604 to connector 632.

In the fifth embodiment RAID system, therefore, each of the two active storage array controllers, 620 and 640, and the passive storage array controller 600, are connected to each of the DASD. Each DASD has two connectors leading directly or indirectly to the active and passive controllers. Failure of either of the active controllers or one of the connectors leading to the DASD will result in the assumption of control of the DASD involved by the passive storage array controller.

Figure 8:
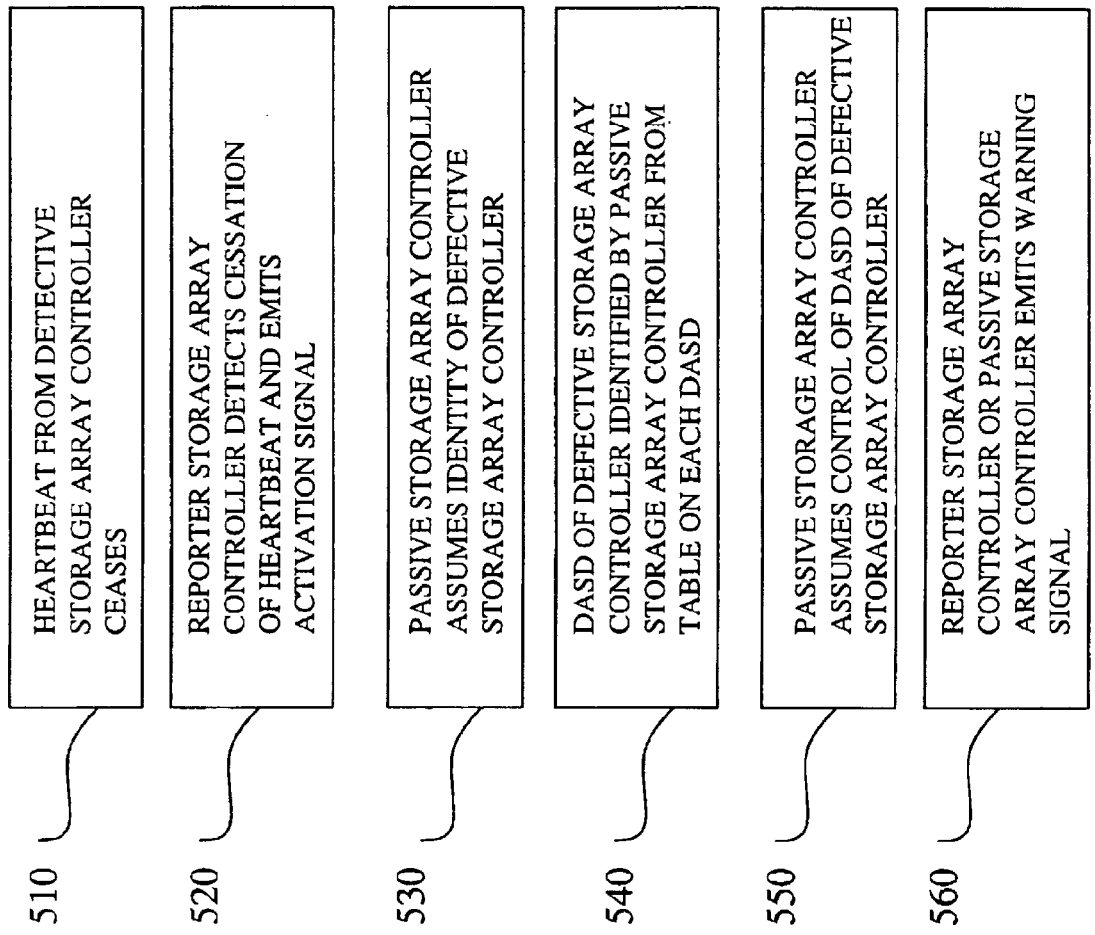
FIG. 8 is a flow chart showing the process of detecting the failure of an active storage array controller by an adjacent storage array controller, assuming the duties of the failed active storage array controller by the passive storage array controller, and signaling the occurrence of a failure.

FIG. 8 is a diagram of the process which occurs after failure of a storage array controller described above with reference to the first embodiment depicted in FIG. 3. The failure of the defective storage array controller 121 of a redundant single RAID subsystem halts the emission of the heartbeat in step 510. The adjacent storage array controller 221, termed the "reporter" storage array controller, notes the cessation of the heartbeat emitted by the defective storage array controller and emits an activation signal 520. Using its associated interface chip, the passive storage array controller 100 assumes the identity of the defective storage array controller 121 in step 530. The passive storage array controller 100 also identifies the DASD of the defective storage array by reading a table of DASD addresses and storage array controller assignments previously stored on each DASD 540. The newly activated passive storage array controller 100 assumes control of the DASD of the defective storage array controller 121 in step 550. Finally, the reporter storage array controller 221 or the newly activated passive storage array controller 100 emits a warning signal to alert the operator of the RAID system to the need for repair or replacement of the defective storage array controller in step 560.

Figure 9:
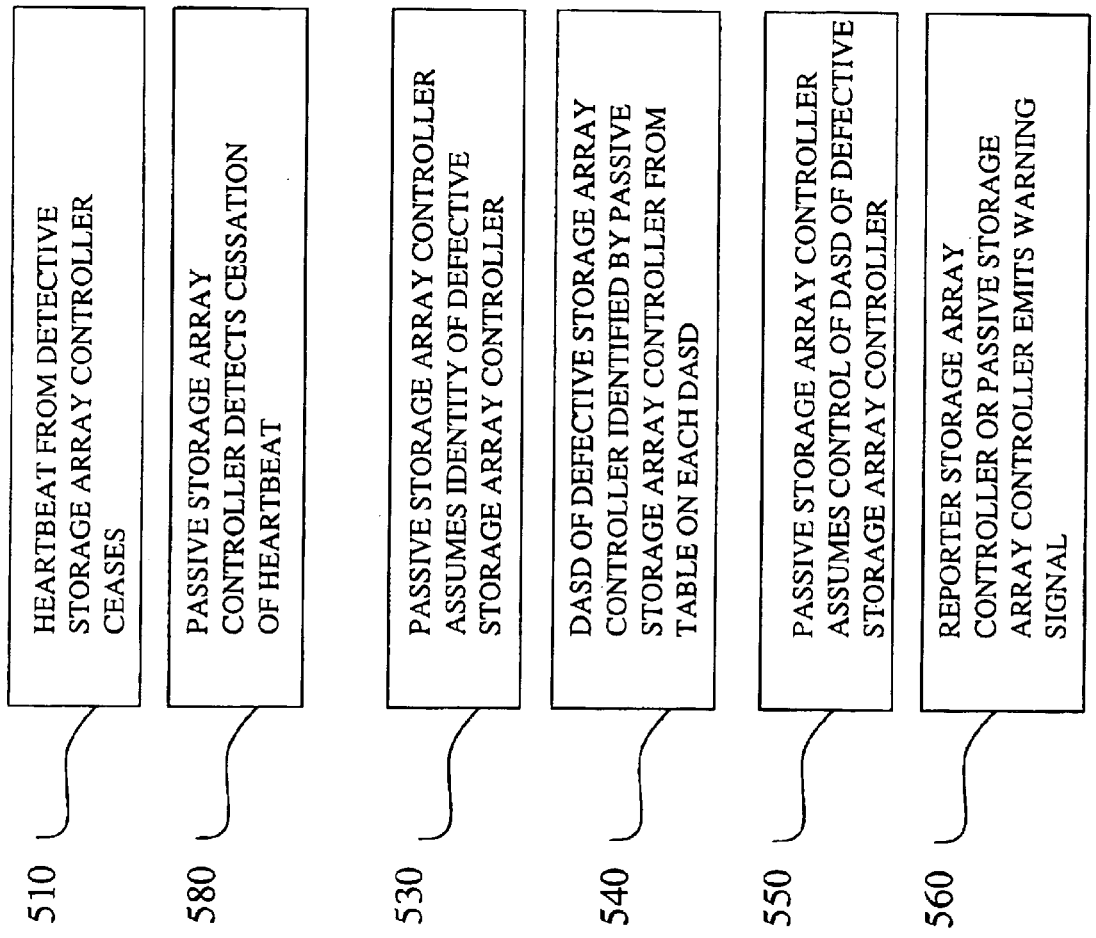
FIG. 9 is a flow chart showing the process of detecting the failure of an active storage array controller by the passive storage array controller, assuming the duties of the failed active storage array controller by the passive storage array controller, and signaling the occurrence of a failure

FIG. 9 is a diagram of an alternate process which occurs after failure of a storage array controller described above with reference to the first embodiment depicted in FIG. 3. The process is the same as in FIG. 8 except that step 520 is deleted and in step 580 the passive storage array controller 100 detects the cessation of the heart beat. In all other respects the process in FIG. 9 is identical to that in FIG. 8.

Although the above example depicts a RAID system having three redundant single RAID subsystem and one passive storage array controller, the number of redundant single RAID subsystems may range from 1 to n, where n is a arbitrary number, as in FIGS. 5 and 6. A preferred range for n is 2–20. Of course, the larger n is, the lower the relative additional cost of including the passive storage array controller in the system. On the other hand, the larger n is, the greater is the chance, however remote, that greater than one storage array controller will fail before the first failed storage array controller is repaired or replaced by the operator.

The RAID system of this invention is characterized by undiminished channel capacity despite failure of a DASD, connector, or storage array controller. Thus the channel capacity (C) of a RAID system comprised of n single RAID subsystems, or n redundant single RAID subsystems, each of which has the same capacity c, is $C=(n)(c)$ despite the failure of any one of a DASD, connector or storage array controller. This is an important advantage over conventional RAID systems because the conventional RAID systems suffer diminished capacity when a connector, or storage array controller fails. In particular, if a conventional RAID system comprises two subsystems and operates without a failed component at a capacity $C=2(c)$ and one storage array controller or connector fails, the capacity of the RAID system becomes $C=c$. Thus in this example the capacity is reduced by half by the failure of a connector or storage array controller.

In the more general case, if a conventional RAID system comprises n subsystems, the capacity of the normally operating system is $C=(n)(c)$, and the capacity after the failure of a subsystem is $C=(n-1)(c)$. Thus the capacity is reduced by a factor related to the number of subunits by the failure of a subsystem.

It will be apparent to those skilled in the art that the examples and embodiments described herein are by way of illustration and not of limitation, and that other examples may be used without departing from the spirit and scope of the present invention, as set forth in the appended claims.

We claim:

1. The process of maintaining the channel capacity of a RAID system having storage array controllers which control direct access storage devices (DASD) and which generate a binary signal termed a heartbeat when the storage array controllers are operational when an active storage array controller fails comprising the steps of:
    a. ceasing the emission of the heartbeat by a defective active storage array controller,
    b. detecting the cessation of the heartbeat by a defective active storage array controller and emission of an activation signal by a reporter active storage array controller,
    c. detecting the activation signal by a passive storage array controller and assuming the identity of the defective active storage array controller by the passive storage array controller,
    d. identifying the DASD of the defective storage array controller by the passive storage controller using a table on each DASD,
    e. assuming control of the DASD of the defective storage array controller by the passive storage controller.
2. The method of claim 1 further comprising after step e:
    f. emitting a defective storage array controller signal by the reporter storage array controller or the passive storage array controller.

* * * * *